Figure 14:
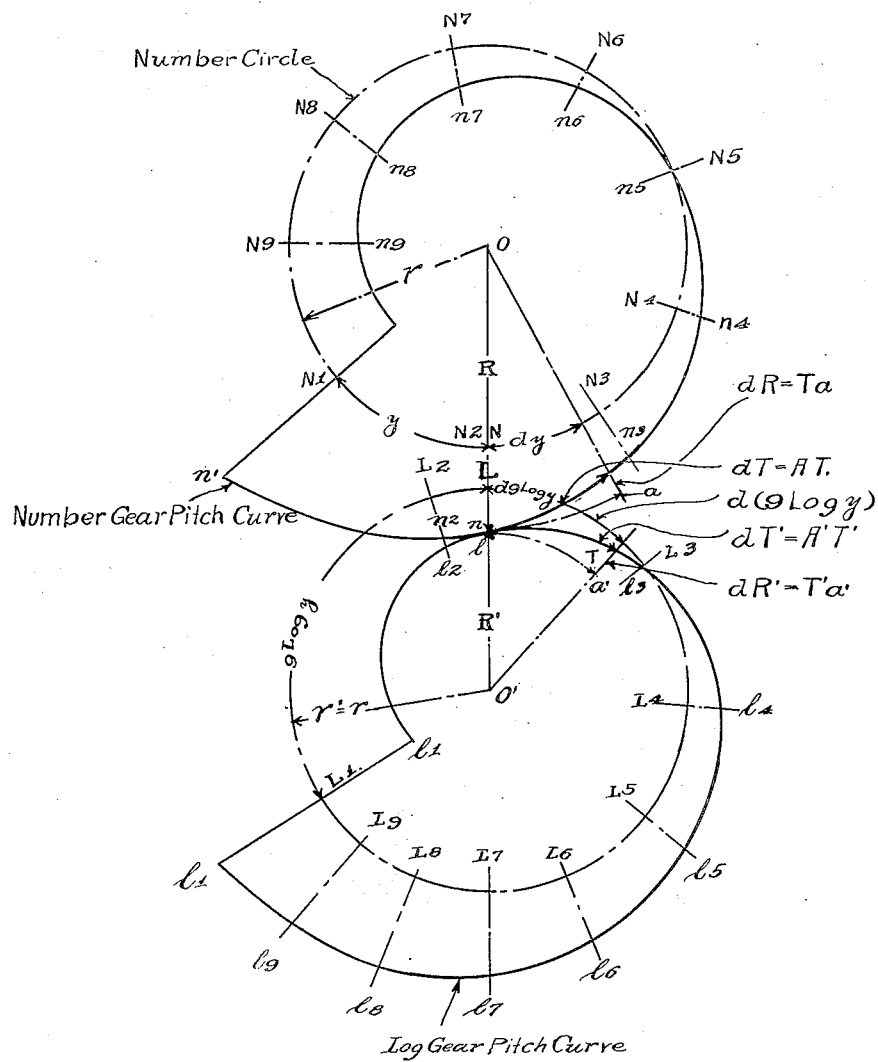

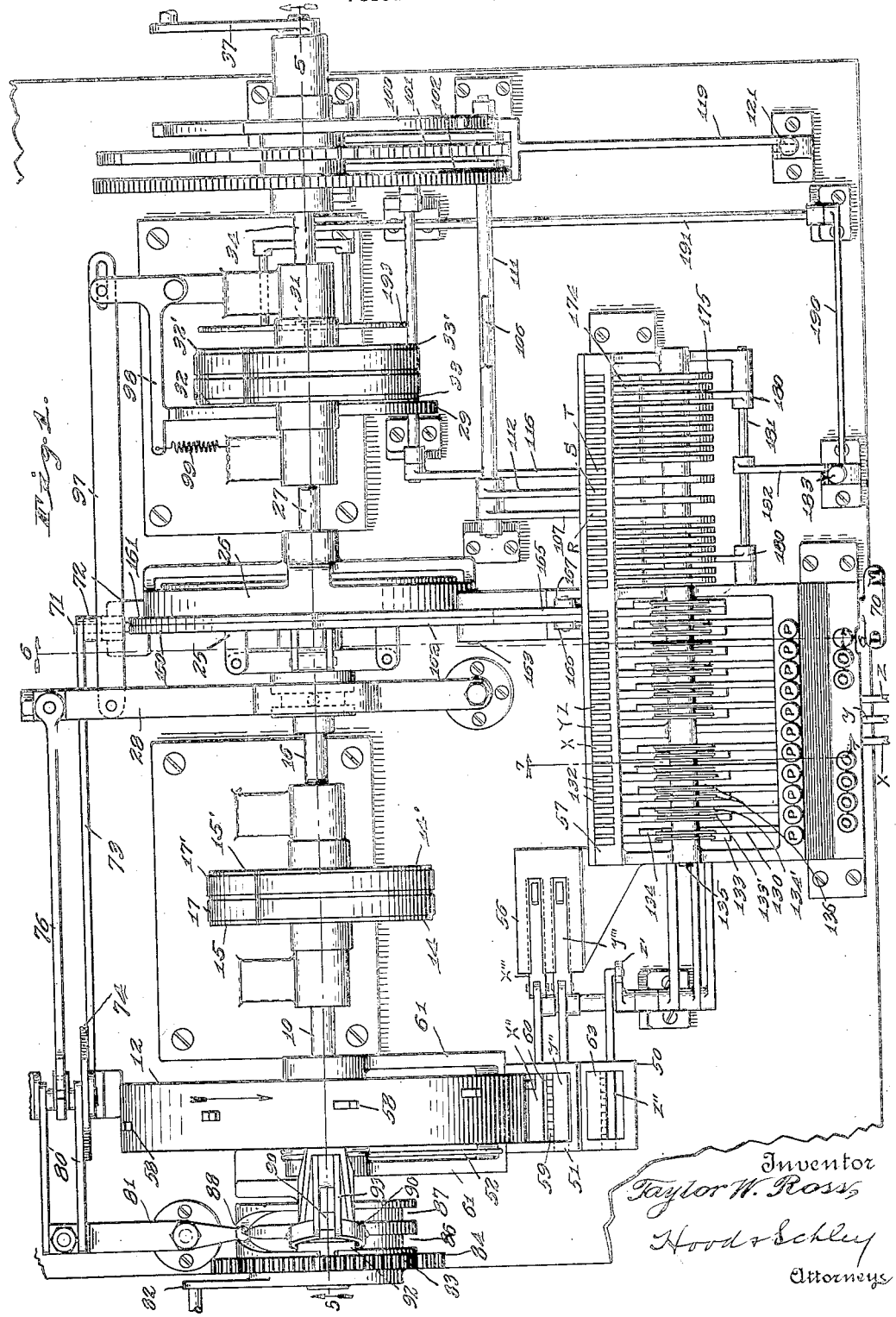

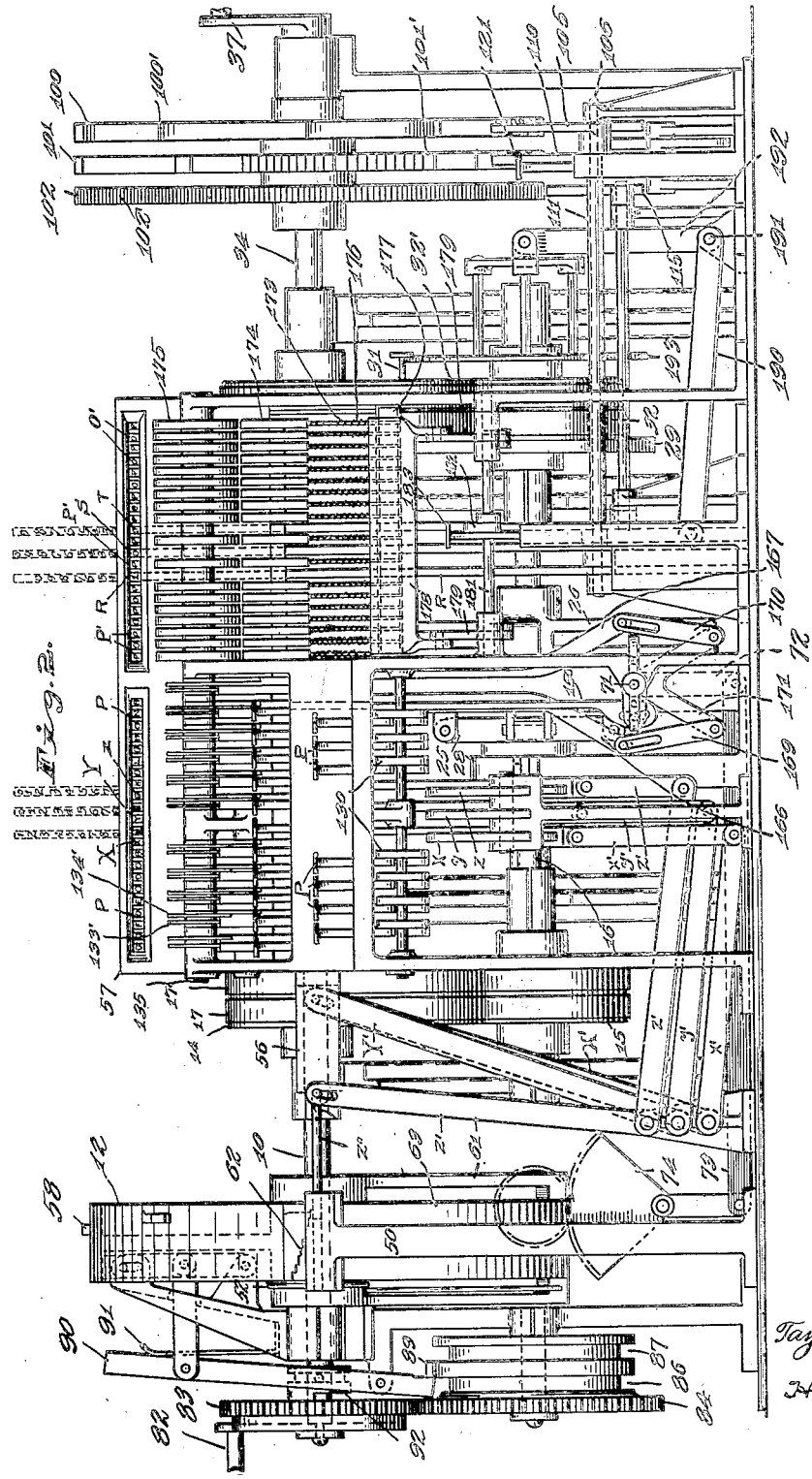

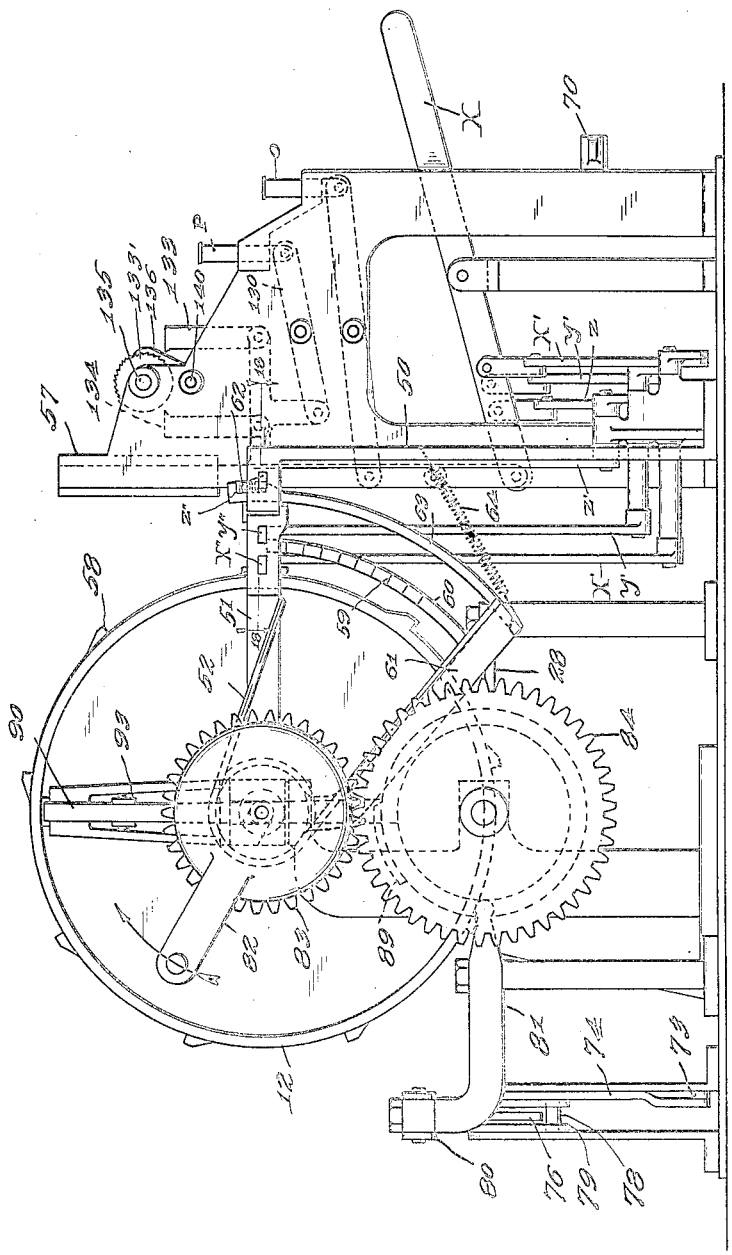

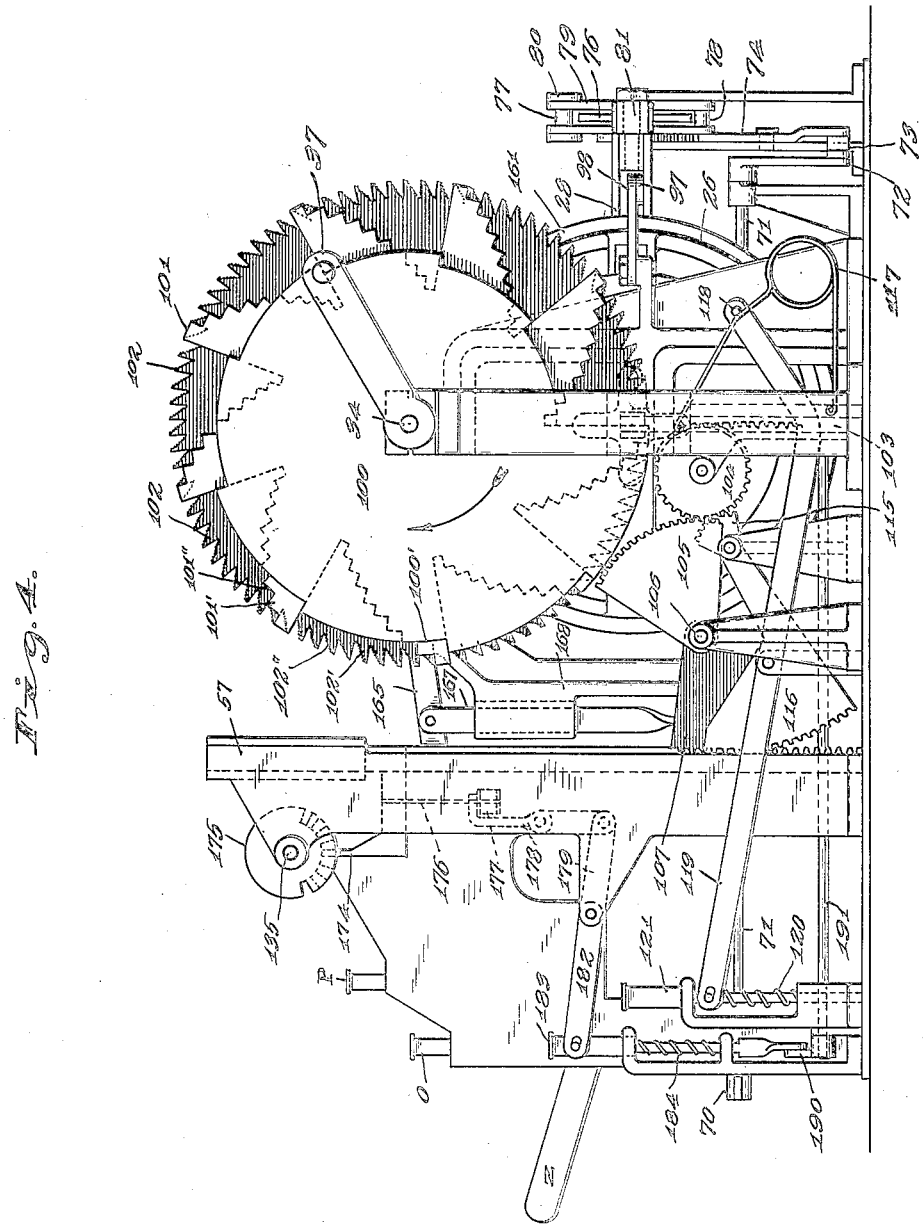

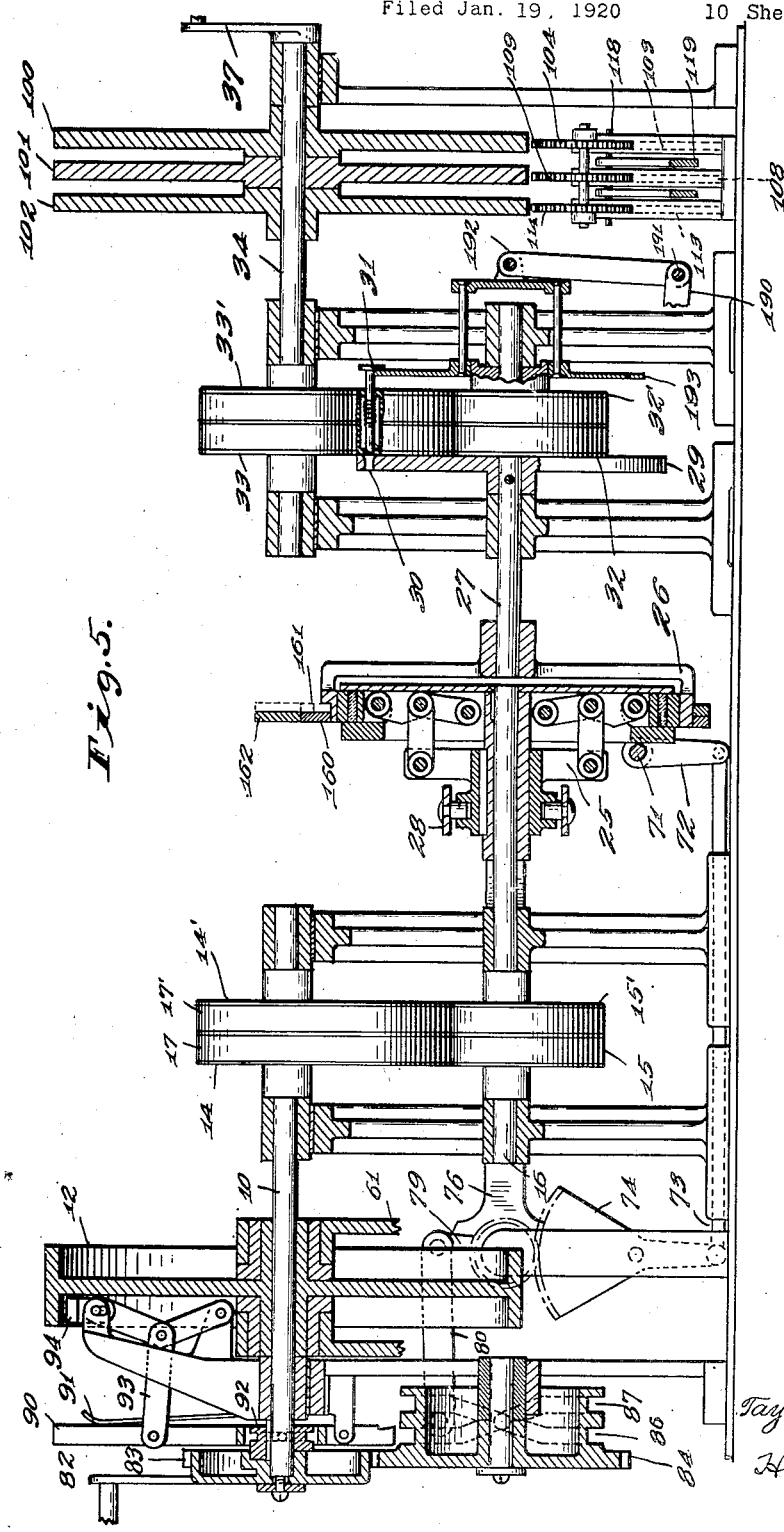

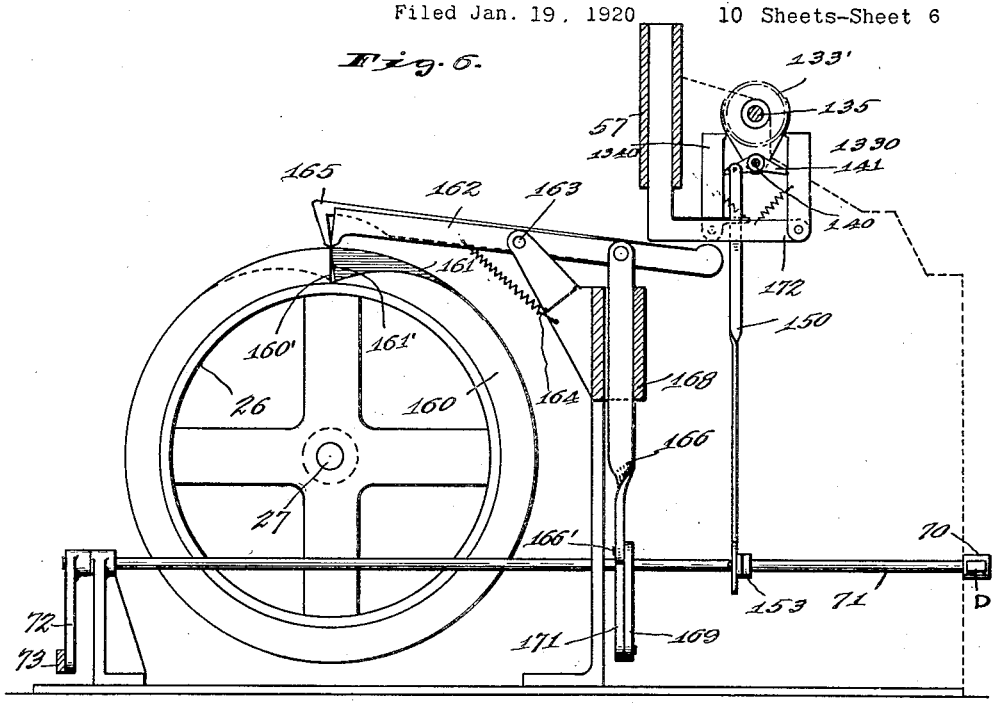
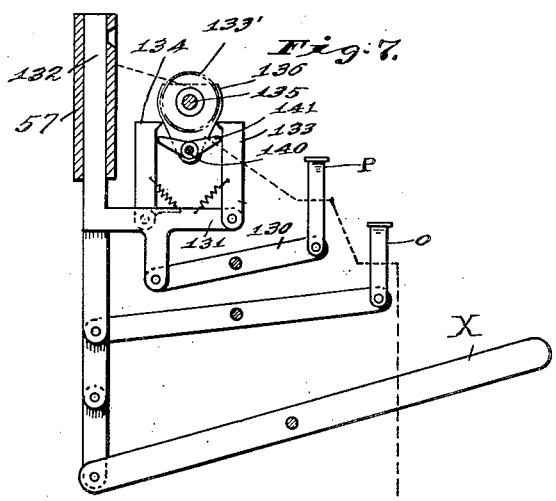
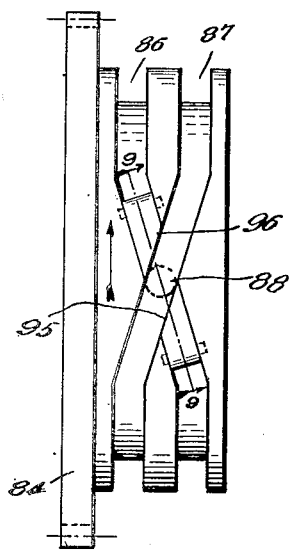
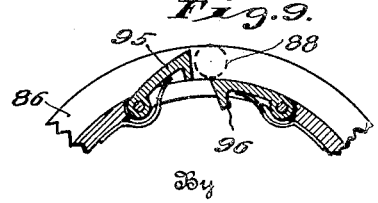

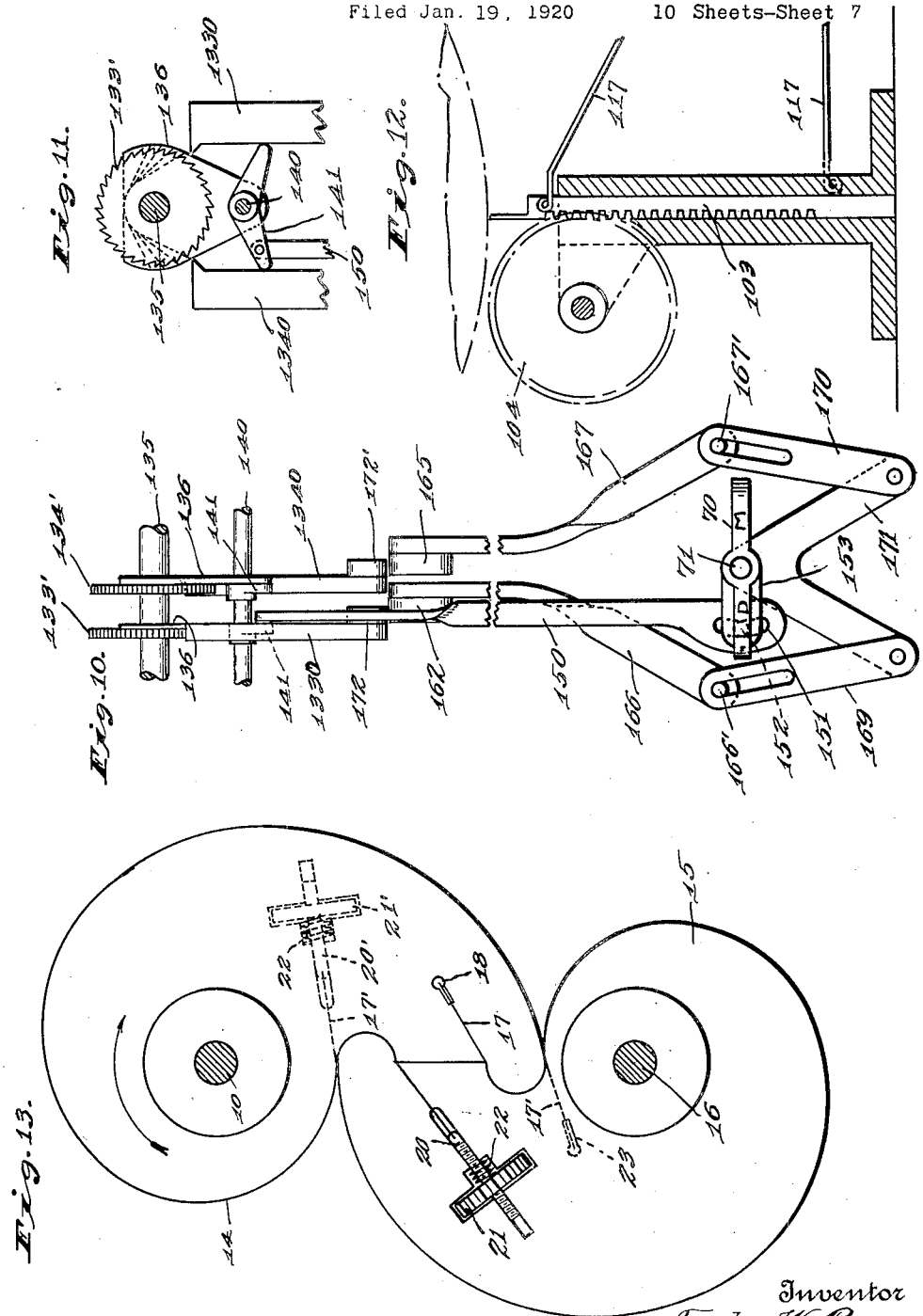

Aug. 5, 1924.
T. W. ROSS
1,503,810
CALCULATING MACHINE
Filed Jan. 19, 1920   10 Sheets-Sheet 9
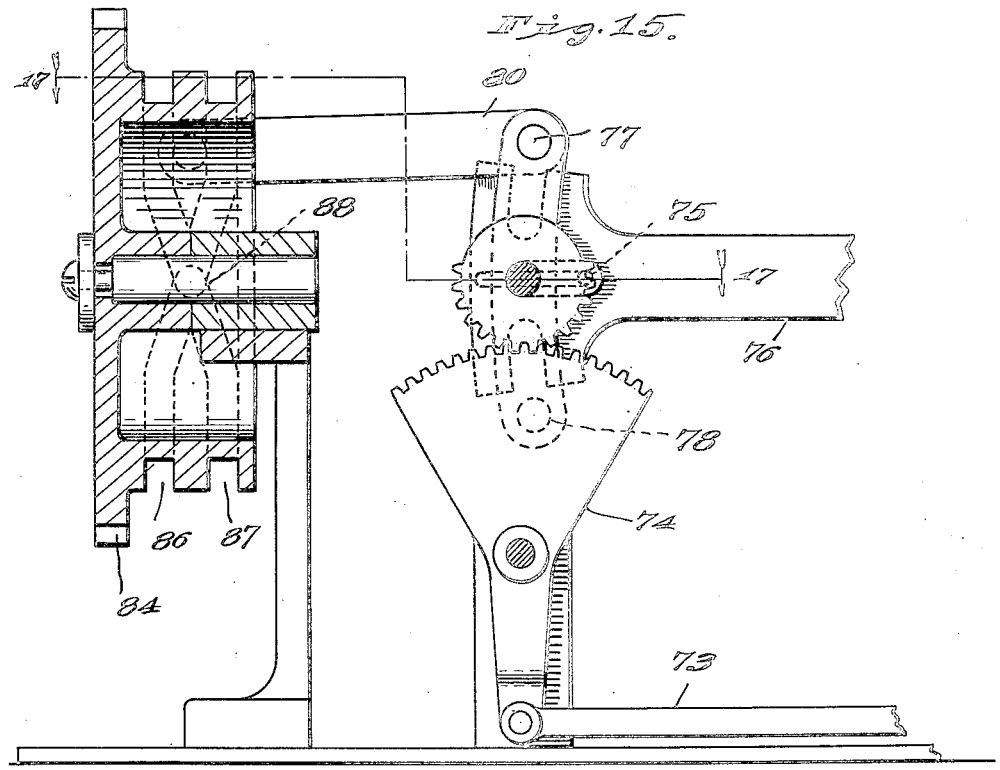
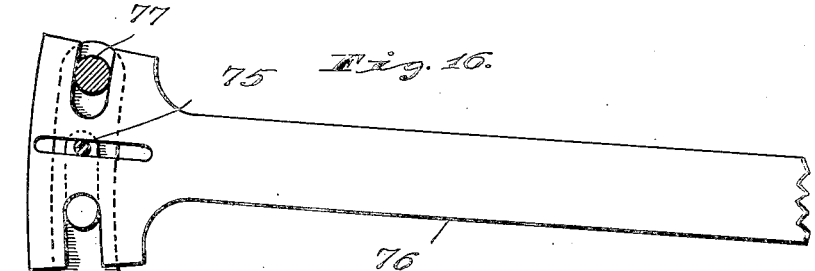
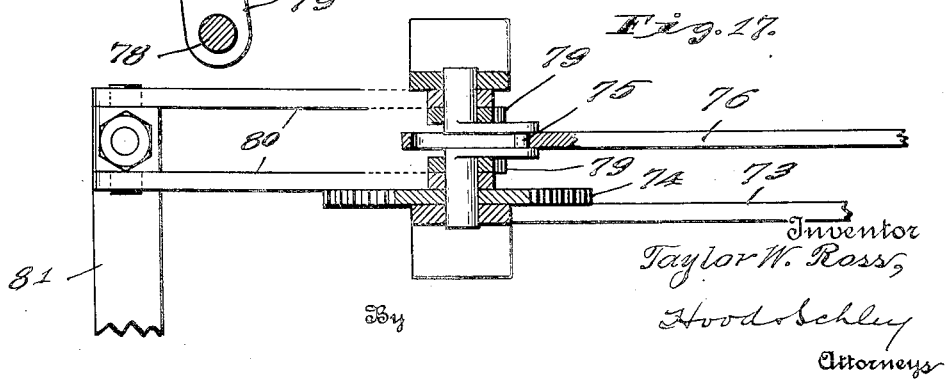
Inventor
Taylor W. Ross,
By Hood Schley
Attorneys

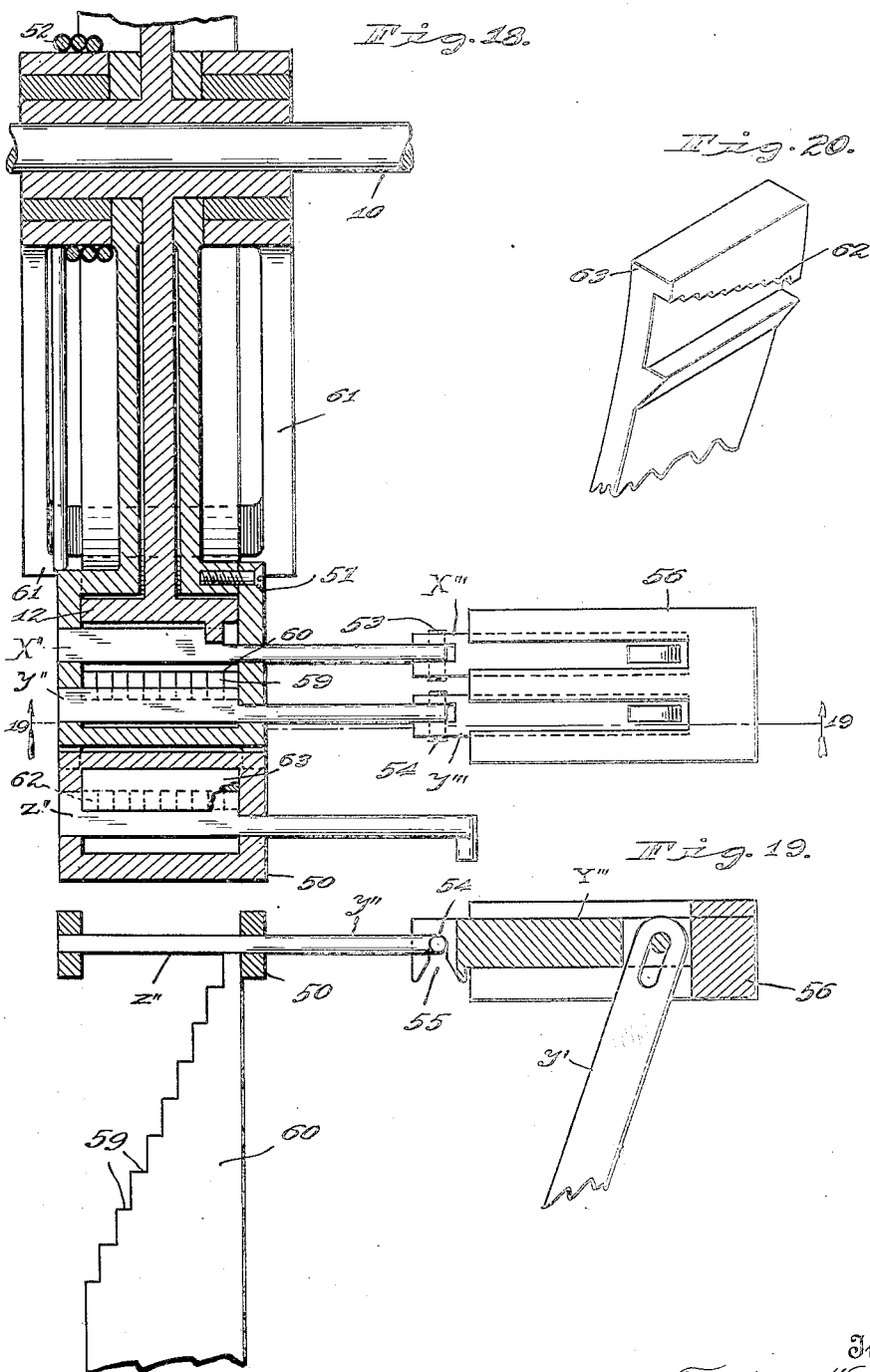

Patented Aug. 5, 1924.

1,503,810

UNITED STATES PATENT OFFICE.

TAYLOR W. ROSS, OF MADISON, INDIANA.

CALCULATING MACHINE.

Application filed January 19, 1920. Serial No. 352,314.

*To all whom it may concern:*

Be it known that I, TAYLOR W. Ross, a citizen of the United States, residing at Madison, in the county of Madison and State of Indiana, have invented a new and useful Calculating Machine, of which the following is a specification.

In my pending application, Serial No. 261,765, I show a simple and fundamental mechanism by means of which successive mathematical multiplications and divisions, in any desired order, may be mechanically performed without the necessity of mental calculations or processes other than those required in manipulating the mechanism to set and operate the several elements to successively indicate the proper multiplier or divisor.

The object of my present invention is to supplement the fundamental elements by mechanism which will increase the mathematical range of the apparatus.

The accompanying drawings illustrate my invention. Fig. 1 is a plan of an apparatus embodying my invention; Fig. 2 a front elevation; Fig. 3 an elevation of the receiving end of the apparatus; Fig. 4 an elevation of the result end of the apparatus; Fig. 5 a fragmentary vertical section on line 5—5 of Fig. 1; Fig. 6 a section on line 6—6 of Fig. 1; Fig. 7 a fragmentary section on line 7—7 of Fig. 1; Fig. 8 a detail of the clutch-controlling cam; Fig. 9 a section on line 9—9 of Fig. 8; Fig. 10 a fragmentary detail of the mechanism for determining multiplication or division operations; Fig. 11 a fragmentary detail of one of the ratchet mechanisms of the decimal shaft; Fig. 12 a fragmentary vertical section of one of the result-determining slides; Fig. 13 a detail of one pair of associated numeral and logarithmic elements; Fig. 14 a diagram showing the method of determining the form of the number gear pitch curve and the log gear pitch curve; Fig. 15 a fragmentary detail of the reversing means, on a larger scale; Fig. 16 a fragmentary detail of the parts shown in Fig. 15; Fig. 17 a section on line 17—17 of Fig. 15; Fig. 18 a section, on a larger scale, on line 18—18 of Fig. 3; Fig. 19 a section on line 19—19 of Fig. 18; and Fig. 20 a fragmentary perspective of the upper end of arm 63.

In the drawings, 10 indicates a shaft carrying a primary indicator wheel 12, the purpose of which will be made to appear. Secured to shaft 10 (Figs. 5 and 13) is an element 14, the periphery of which is determined by a variable radius which is a logarithmic function of any variable number measuring the angular distance of the radius from the initial radius of element 14. This element 14 will be hereafter referred to as the numerical element. Mating with the numerical element 14 is an element 15, the periphery of which is determined by a variable radius (angularly spaced from the initial radius by an angle which is measured by the logarithm of the number represented by the corresponding and complementary radius of the numerical element 14, which added to the corresponding and complementary radius of element 14, is a constant equal to the distance between the axes of the shaft 10 and the shaft 16 which carries element 15. This element may be conveniently referred to as the logarithmic element. Any suitable means, such as gear teeth, straps, etc., may be provided to form a connection between the numerical and logarithmic elements 14 and 15, so that rotation of one will produce corresponding rotation of the other.

In the present drawings, (Fig. 13) I have illustrated a tension tape connection 17, between the elements 14 and 15, this tape 17 being anchored at 18 to element 14 near the longest radius of said element and passed thence around the tip thereof and from there wrapped around the periphery of element 15 and around the tip of the longest radius of element 15 and attached to an adjusting screw 20 which passes through an adjusting nut 21 mounted in element 15 and backed by a spring 22 which will maintain a tension in tape 17.

In order that reverse rotation of shaft 10 may act upon shaft 16 by a pull upon a tension tape, instead of a push upon tape 17, I provide the companion numerical elements 14' and 15', (Fig. 5) corresponding to elements 14 and 15, and these are connected by a tape 17', one end of which is anchored at 23 to element 15' and passed from thence around the periphery of element 14' and anchored, by means of adjusting screw 20' and nut 21', adjacent the smallest radius of element 14'.

Shaft 16 lies parallel with shaft 10 and carries a friction clutch member 25 (Fig. 5) which cooperates with the friction clutch member 26 carried by shaft 27 alined with shaft 16, the clutch member 25 being provided with an operating lever 28, by means of which it may be thrown into and out of engagement with member 26'.

Secured to shaft 27 is a disk 29 provided at one point with hole 30 (Fig. 5) which is adapted to receive a pin 31 carried by logarithmic elements 32, 32', which correspond to the elements 15, 15', said elements 32, 32' being journaled freely upon shaft 27. The elements 32 and 32' are connected by tapes (like the tapes 17 and 17' already described) with numerical elements 33 and 33', respectively, corresponding to the elements 14 and 14', and secured to a shaft 34.

Shaft 34 is provided with a crank 37 by which it may be operated. Thus far the apparatus is the same as that shown in my above-mentioned application.

As shown in my present application my apparatus is provided with mechanism for dealing with numbers of three digits as a typical illustration for amplification to increase the capacity of the apparatus to any desired extent.

For the purpose of setting the mechanism to deal with a desired number of three digits, I provide three levers or keys $x$, $y$, $z$, (Figs. 1, 3 and 18) connected respectively in any suitable manner, as by a train of links and levers $x'$, $y'$, $z'$, with three stop fingers $x''$, $y''$, $z''$. Finger $z''$ is mounted to slide in a stationary guide 50 and fingers $x''$ and $y''$ are mounted to slide in a swinging arm 51 sleeved over shaft 10 and straddling wheel 12, said arm being normally held up against guide 50 by a spring 52.

Fingers $x''$ and $y''$ are provided, at their outer ends, with cross bars 53 and 54, respectively, which enter a downwardly open pocket 55 in slides $x'''$ and $y'''$ mounted in guide 56 and forming parts of the connecting trains $x'$ and $y'$, respectively.

To set any desired number into the machine keys $x$, $y$, $z$, are depressed to a proper extent, corresponding with the desired digit indicated by graduated bars X, Y, Z, (connected to keys $x$, $y$, $z$, respectively, and sliding in guide 57), thus shifting fingers $x''$, $y''$, $z''$, (if the desired digit is not zero to the left (Fig. 1)). This movement will shift finger $x''$ into the path of the proper one of a series of nine lugs 58 projecting from the surface of wheel 12, said lugs being spaced 40° apart circumferentially and having their lefthand ends successively laterally offset, as indicated in Figs. 1 and 18.

The above described movement of finger $y''$ will set it into the path of movement of the appropriate one of a series of nine laterally offset shoulders 59 (Fig. 18) carried by an arc-shaped arm 60 carried by an arm 61 sleeved about the hub of wheel 12 and forming the axis of arm 51. Arm 60 is concentric with shaft 10 with its free end normally blocked by finger $y''$ when said finger is in its zero position, and shoulders 59 are spaced from this end in successive steps of four degrees.

The movement of finger $z''$ will shift it to the left Figs. 1 and 18 and move it into the path of movement of the appropriate shoulder of a series of ten shoulders 62 formed on the end of an arc-shaped arm 63 carried by arm 61 and concentric with shaft 10. The initial (lower) shoulder of series 62 is blocked by finger $z''$ when said finger is in its zero position and the other shoulders of the series are successively circumferentially spaced apart 0.4 degrees and successively laterally offset to cooperate with the successive lateral positions of finger $z''$.

Arm 61 is normally urged upwardly by a spring 64. It will now be seen that, after keys $x$, $y$, $z$, have been appropriately set, wheel 12 may be rotated, in the direction indicated by the arrows in Figs. 1 and 3, and when so rotated, the appropriate lug 58, determined by the lateral position of finger $x''$. Thereupon, arm 51 will be moved down, withdrawing bars 53 and 54 of fingers $x''$ and $y''$ from pockets 55, until finger $y''$ engages the appropriate shoulder 59 of arm 60, determined by the lateral setting of finger $y''$. Thereupon, the arm 51, acting through finger $y''$ upon a shoulder 59 of arm 60, swings arm 61 downwardly until the appropriate shoulder 62 of arm 63 comes to a stop against finger $z''$.

Wheel 12, by the above-described operation, has been caused to assume an angular position which will be a function of, and indicative of, the number indicated by the set positions of the keys $x$, $y$, $z$.

Rotation of shaft 10, as described above, to an angular position indicative of the number $xyz$ will produce a rotation of shaft 16 to an angular position indicative of the logarithm of number $xyz$, because of the relative shapes of the elements 14—14' and 15—15'.

In order to lay out the periphery of element 14, which may be conveniently called the number-gear pitch-curve, it is, of course, apparent that the distance between the centers of shafts 10 and 16 will be a determining factor and this distance will, of course, be equal to the sum of any two corresponding radii of the number pitch curve of element 14 and the logarithm-gear pitch curve of element 15. Assuming then that K=distance between centers of shafts 10 and 16, M=modulus of common systems of logarithms, which equals 0.434294, R=variable radius of the number pitch curve, then $$R = \frac{9MK}{y+9M} = \frac{3.908646K}{y+3.908646}$$

where $y$=any variable quantity between 1 and 10.

The corresponding radius R' of the logarithm-gear pitch-curve will be equal to K minus R. The formula for determining the values (Fig. 14) of R and R' is developed in the following manner:

In Fig. 14, let O and O' be any two points representing the centers of a pair of variable pitch curves such that when the pitch curve $n1, n2, n3, n4, n5, n6, n7, n8, n9$, revolves about the center "O," its angle of travel from the initial point $n1$ will represent numbers and the corresponding angle of travel from the initial point $l1, l2, l3, l4, l5, l6, l7, l8, l9$, will represent the log corresponding to the number in manner as described in the next two paragraphs.

Connect O and O' by a straight line OO' and with O as a center and $r$ as a radius describe a circle N1, N2, N3, N4, N5, N6, N7, N8, N9, which points represent integers from 1 to 9 respectively, and divide the circumference into nine (9) equal arcs. These points from 1 to 9 on the circumference of this circle will measure the angle from the initial point N1 to the respective point in so many ninths of the circumference. Let $y$ be any integer or fractional part of an integer between the limits of 1 and 10, and let it be represented by the point N on the circumference of the circle N1, N2, etc., N9, such that its distance from the initial point N1 measured on the circumference will be N ninths of the whole circumference.

With O' as center and $r'=r$ as radius describe a circle L1, L2, L3, L4, L5, L6, L7, L8, L9 which points are so situated that their distances, measured from the initial point L1 on the circumference, are the common logarithms of 1, 2, 3, 4, 5, 6, 7, 8, and 9, respectively, measured on a scale such that the whole circumference equals the log of 10 which is 1 minus the log of 1 which is zero, and therefore the whole circumference is equal to unity (1).

When the circle with center as O moves through a complete circumference or 9 ninths, the circle whose center is O' must move through a complete circumference which equals (log 10—log 1), 1 or expressing the angle in ninths of the circumference, that is, in the same terms as that used for the number circle, the angle of travel of the log circle, expressed in ninths of the circumference would be equal to 9 (log 10—log 1); and for any point on the circumference, the angle of travel of the log circle would be $9(\log 10 - \log y) = 9 \log y$ for a corresponding angular travel $y$ of the number circle.

Let $n$ and $l$ be corresponding contact points on the number pitch curves and the log pitch curve respectively such that the angle of travel of the number gear, from the initial point N1, to $n$ represents the number N; and the corresponding angle of travel of the log gear from the initial point L1 to $l$, represents the logarithm L of the number N. The radius of the number gear at the point $n$ will be represented by $On=R$. The radius of the log gear at the point $l$ will be represented by $O'l=R'$.

With the center O and a radius $On=R$, describe the arc $na$. With the center O' and the radius $O'l$, describe the circle $la'$. Let the linear length of the arc $na$ equal linear length of the arc $la'$, so that if the number gear and log gear were to revolve from the corresponding contact points $n$ and $l$ to the points $a$ and $a'$, maintaining a constant ratio of angle of travel equal to $$\frac{y}{9 \log y}$$

for the particular values of $y$ and $\log y$ corresponding to the contact points $n$ and $l$; then $na$ and $la'$ would represent the arcs of the number pitch circle and the log pitch circle to maintain this contact ratio of angle of travel.

Let T be the point on the number pitch curve at the radial line O$a$ and let T' be the point on the log pitch curve at the radial line O'$a'$ extended, such that when the number gear rotates from $n$ to T, the log gear will rotate from $l$ to T' maintaining the desired variable ratio of angle of travel as previously stated, namely:

$$\frac{y}{9 \log Y}$$

Then R and R' will have decreased and increased respectively by AT and A'T' in the travel of the number gear and log gear, respectively, from $n$ to T and from $l$ to T' and as OO'=R+R'=constant, then $a$T=$a'$T'.

Let $n$T and $l$T' diminish such that in the limit $n$T becomes $d$T and $l$T' becomes $d$T' and at the same time $a$T and $a'$T' will diminish and in the limit, $a$T becomes $d$R and $a'$T' becomes $d$R'.

In the limit we have two triangles with two sides respectively equal namely $na=la$ and $d$R=$d$R' and therefore the third sides are equal namely:

(Eq. #1)  $d$T=$d$T'

As $na$ and $dy$ are arcs of circles with radii

R and $r$ respectively and measure the same angle, we get (Eq. #2) $\quad \dfrac{na}{R} = \dfrac{dy}{r}$ (Eq. #3) $\quad na = \dfrac{R}{r}(dy)$ From the small triangle ($na$T) at the limit we get (Eq. #4) $\quad \dfrac{2}{dT} = \dfrac{2}{na} + \dfrac{2}{dR}$ and from Eq. #2 we get (Eq. #5) $\quad \dfrac{2}{dT} = \dfrac{2}{\dfrac{R}{r}dy} + \dfrac{2}{dR}$ As $la'$ and $d$ (9 log 6) are arcs of radii R' and $r'$ we get (Eq. #6) $\quad \dfrac{la'}{R'} = d\dfrac{(9 \log y)}{r'}$ (Eq. #7) $\quad la' = \dfrac{R'}{r'} d(9 \log y)$ From the small triangle $la'$ T' at the limit we get (Eq. #8) $\quad \dfrac{2}{dT'} = \dfrac{2}{la'} + \dfrac{2}{dR'}$ and from Eq. #6

(Eq. #9) $\quad \dfrac{2}{dT'} = \dfrac{2}{\dfrac{R'}{r'}d(9 \log y)} + \dfrac{2}{dR'}$ From Eq. #1 we find $dT = dT'$ and combining Eq. #5 and Eq. #9, we get (Eq. #10) $\quad \dfrac{2}{\left[\dfrac{R}{r}dy\right]} + \dfrac{2}{dR} = \dfrac{2}{\left[\dfrac{R'}{r'}d(9 \log y)\right]} + \dfrac{2}{dR'}$ As $OO' = R + R'$ and by construction $r = r'$, we get (Eq. #11) $\quad \dfrac{2}{\left[\dfrac{R}{r}dy\right]} = \dfrac{2}{\left[\dfrac{R'}{r}d(9 \log y)\right]}$ (Eq. #12) $\quad \dfrac{R}{r}dy = \dfrac{R'd}{r}(9 \log y)$ Eq. #13) $\quad Rdy = R'd(9 \log y)$ Let $OO' = K$ which is a constant and in Eq. #13 substitute for R' its equivalent K–R and we get:

(Eq. #14) $\quad Rdy = (K-R)d(9 \log y) = 9(K-R)d(\log y)$

By dividing each side of Eq. #14 by $9(K-R)dy$, we get:

(Eq. #15) $\quad \dfrac{d(\log y)}{dy} = \dfrac{R}{9(K-R)}$

By multiplying each side of Eq. #15 by $y$ we get:

(Eq. #16) $\quad \dfrac{d(\log y)}{\dfrac{dy}{y}} = \dfrac{Ry}{9(K-R)}$

It can be demonstrated that:

(Eq. #17) $\quad \dfrac{d(\log y)}{\dfrac{dy}{y}} = m$

For the demonstration, see Taylor's "Elements of Calculus," Art. 34, page 24, in which it is demonstrated that $m$ is a constant for any system of logarithms and is called the modulus. The value of $m$ for the common system of logarithms of which ten (10) is the base, calculated to ten places, is 0.4342944819, see Williamson's "Differential Calculus," Art. 29, pages 24, 25 and 26 and on the method of determination of $m$, see Galbraith's "Algebra," page 379. For this purpose, we will use the value of $m$ to six places, that is $m = .434294$.

From Eq. #16 and Eq. #17, we get:

(Eq. #18) $\quad Ry = 9m(K-R) = 9mK - 9mR$.

(Eq. #19) $\quad R = \dfrac{9mK}{y + 9m} = \dfrac{9(.434294K)}{y + 9(.434294)}$ (Eq. #20) $\quad R = \dfrac{3.908646K}{y + 3.908646}$ After a desired number has been set into the machine, as above described, the operator presses upon the appropriate end D (meaning division) or M (meaning multiplication) of a lever 70 (Figs. 1, 2 and 10) carried by a rock shaft 71, connected, by an arm 72 and link 73, with a segment 74 (Figs. 15 and 17) which serves to swing the crank pin 75 either up or down and thus shift the selecting link 76 either up or down. The swinging movement of link 76 brings its free end into engagement with one or the other of two pins 77, 78 carried by opposite ends of a lever 79 connected by a link 80 with a lever 81. The selecting link 76 is attached to the clutch-operating lever 28.

Assuming that the "M" end of lever 70 has been depressed, the operator grasps crank 82 (Figs. 1 and 2) and starts gear 83 into rotation freely on shaft 10, in the direction indicated by the arrow, and thus rotates gear 84 (Figs. 5 and 8) which is conveniently 50% larger than gear 83 and carries a pair of cam grooves 86 and 87 which join at 88 and receive one end of lever 81 (Figs. 1 and 3), so that lever is promptly shifted so as to swing lever 81 and lever 79 so as to shift clutch 25 into engagement with member 26. Clutch 25 is moved into action with member 26 during the motion of crank 82 from its initial position, as shown in Fig. 3 to the top center position. When crank 25 arrives at the top center position, the first time in its forward motion, a shoulder 89 (Fig. 2) between grooves 86—87 is withdrawn from in front of lever 90 so that spring 91 shifts said lever and pulls upon a link 93 (Fig. 5) which, in turn, withdraws finger 94 from engagement with wheel 12 and at the same time, shifts clutch member 92, splined on shaft 10, into engagement with gear 83, so that further movement of gear 83, in the forward direction, moves wheel 12 through clutch 92, until wheel 12 is stopped by the fingers $x''$, $y''$, $z''$, in the manner already described. The forward movement of wheel 12 causes a movement of shaft 16 to a position which will be a function of the logarithm of the number indicated by the position of wheel 12; and shaft 27 and disk 20 will be correspondingly positioned to an angular position which will be a function of the said logarithm.

When wheel 12 comes to a stop, the operator moves the upper end of lever 90 to the left (Fig. 2) to withdraw clutch 92 from gear 83 and moves brake 94 into engagement with wheel 12 so as to hold it in the set position. Gear 83 is then continued in its forward movement until crank 82 has arrived at the top center position the second time in its forward motion and on continuing crank 82 forward beyond the top center, clutch lever 28 is moved to its mid-position and gear 84 is given a complete rotation, approaching which a spring block 95 (Figs. 8 and 9), at the end of groove 86, rides under the end of lever 81 and springs back into blocking position. This continued forward movement of crank 82 from the top center position will withdraw clutch 25 (Fig. 1) from clutch 26 and a shoulder 89 between grooves 86—87 prevents clutch 92 and gear 83 from being connected during this same forward movement from the top center and also during the backward movement of crank 82 to the top center. Continued reverse movement of gear 83, after crank 82 has arrived at top center, brings key way in gear 83 opposite key on clutch 92 when spring 91 moves clutch lever 90 to the left hand, engaging clutch 92 with gear 83 and withdraws brake 94 (Fig. 5) from wheel 12; and continued backward movement of gear 83 brings wheel 12 to a stop at its normal or zero position and elements 14—15 come to zero position when crank 82 arrives at the top center the second time on its backward stroke. The operator then manually shifts lever 90 to withdraw clutch 92 from gear 83 and sets brake 94 on wheel 12 to hold same in position, whereupon, the operator continues the reverse movement of gear 83 to initial position, this movement finally carrying the spring block 96, (Fig. 9) in groove 87 beneath and beyond the end of lever 81 and this continued reverse movement of crank 22 beyond the top center throws clutch lever 28 to its normal position.

Movement of lever 28, in the direction to connect clutch 25, with clutch 26, causes a link 97 (Fig. 1) to swing brake lever 98 away from engagement with disk 29, said brake being automatically returned, so as to hold disk 29 in any set position, by a spring 99 whenever clutch 25 is withdrawn from clutch 26.

If the "D" end of lever 70 had been pressed, the movements of gear 83 would have operated, through lever 79, to swing lever 28 so that clutch 25 would not engage clutch 26 until the return movement of gear 83 and thus move disk 29 in a reverse direction, thereby subtracting the logarithm of the indicated number $xyz$ so far as the ultimate position of disk 29 is concerned.

The position of the disk 29 will be indicative, when properly translated and construed in the light of the decimal indication which will be described hereafter, of a logarithm which will be the arithmetical result of the several positive logarithms which have been associated for successive divisions.

As already described, the pin 31, carried by the element 32—32', is adapted to be entered into the hole 30 of disk 29 and when so entered, the corresponding position of the element 32—32' likewise indicates the above-mentioned logarithm and the cooperation between elements 32—32' and 33—33' positions shaft 34 in such manner as to be indicative of the numerical value corresponding to the aforesaid logarithmic value. In order to translate this angular position of shaft 34 into a visual indication, I mount upon shaft 34, three disks (Figs. 4 and 5) 100, 101 and 102, so formed as to cooperate with indicating mechanism in such manner as to indicate the first three digits of the numerical value which is being sought. The disk 100 is circumferentially divided into nine equal steps 100', (Fig. 4) of 40° each, each of said steps having a circular arc extent of uniform radius and the successive steps decreasing uniformly in radius. Disk 101 is divided into nine primary sections 101' of 40° circumferential extent, and each of these primary sections is divided into ten equal steps 101' each having an angular extent of 4° and a radial extent equal to the radial extent of one of the steps 100'. Disk 102 has its circumference divided into ninety primary divisions 102', each having a circumferential extent of 4° and a radial extent equal to the radial extent of one of the steps 101''. Each of these primary divisions is then divided into ten equal steps 102', each having a circumferential extent of 4° and a radial extent of 1/10 of the radial extent of one of the steps 101″.

Cooperating with the circumference of disk 100, is a vertically movable rack 103 (Figs. 4 and 12) meshing with a gear 104 which meshes with a segment 105 connected to a shaft 106, this shaft carrying a segment 107 which meshes with a vertically movable number-indicating bar or slide R (Figs. 1 and 2) which carries upon its face a series of nine numbers in regular sequence and successively visible through the sight opening of bar 57. Similarly, vertically-movable rack 108 (Fig. 5) is arranged to cooperate with the stepped periphery of disk 101 and this rack is connected by pinion 109 and segment 110 (Fig. 2) to a tubular shaft 111 sleeved over shaft 106 and carrying a rack 112 which meshes with a vertically movable slide S provided on its face with a regular series of numbers to indicate the second digit of the result. Similarly, a vertically-sliding rack 113 (Fig. 5) is arranged to cooperate with the periphery of disk 102 and this rack meshes with a pinion 114 operating a segment 115 (Fig. 4) which operates a segment 116 meshing with an indicating slide T provided on its face with a series of numbers to indicate the final digit of the result number.

Operating upon each of the vertically sliding racks 103, 108 and 113, is one of a series of springs 117 (Fig. 12), each spring being capable of independently projecting its rack upwardly. The several springs 117 are engaged by pin 118 carried by a lever 119 normally urged by a spring 120 to the position shown in Fig. 4 where the several springs 117 are pushed downwardly by pin 118 so as to retract them from engagement with the peripheries of disks 100, 101 and 102. When shaft 34 has been brought to its ultimate position, by manipulation of crank 37, in order to permit the entry of pin 31 into hole 30, the operator will press down upon key 121 (Figs. 2 and 4) thus swinging lever 119 and permitting the racks 103, 108 and 113 to move upwardly into engagement with the peripheries of the disks 100, 101 and 102, and thereby move the indicator slides R, S and T into positions to give indication of the correct numbers corresponding to those particular portions of the peripheries of disks 100, 101 and 102, which lie opposite the vertically-moving racks. It will, of course, be understood that the driving trains between the vertically-movable racks and the number-indicating slides R, S and T, will be such as to cause proper movement of these slides to bring the proper figure into position opposite the sight opening of bar 57. The ultimate reading obtained from the slides R, S and T will, therefore, give 3 digits of the answer which is being sought. For ordinary purposes, for those computations which are to be performed by a machine of this character, this is sufficiently near to the actual result obtainable by ordinary mathematical computations. The number of elements 100, 101 and 102 shown in the drawings is merely typical.

It is, of course, necessary in interpreting the reading finally obtained from slides R, S and T, to know where to place the decimal point, this decimal point being determined by the ultimate number of rotations through which the disk 29 has been carried. The decimal is, therefore, indicated mechanically in the following manner.

Arranged between keys $x$ and $y$ between keys $y$ and $z$, to the right of key $z$, and to the left of key $x$ is a series of keys P, (Figs. 1, 2 and 7) each of which is connected by a suitable lever 130 with a cross head 131 connected to a slide 132 vertically movable in the bar 57 and carrying at one point on its outer face a decimal point which will come into view opposite the sight opening of the bar 57 when key P is pressed. Each cross head 131 (except that one attached to the key P which lies between keys $x$ and $y$) carries two pawls 133 and 134 arranged to engage the teeth respectively of the oppositely arranged ratchet wheels 133′ and 134′ mounted in bars on shaft 135. Each of these pairs of ratchet wheels is guarded upon each side with a guard 136. The guards relating to the pairs of ratchet wheels manipulated by the first two keys P one to the right and one to the left of the key P which lies between keys $x$ and $y$ is so formed that the adjacent pawls are capable of moving said ratchet wheels a distance of one tooth only; the guards of those pairs of ratchet wheels relating to the next two keys P to the right and one to the left, are formed so as to permit adjacent pawls to shift the ratchet wheels through two steps; and similarly the other guards, successively to the right and left, are so formed as to permit, successively, the advancement of one greater number of teeth. If a multiplier exceeds 10, the ultimate logarithm will have its characteristic increased by 1. If the multiplier exceeds 100, the characteristic will be increased by 2, etc. On the other hand, if operations of division are being performed, the characteristic of the ultimate logarithm will be decreased in the manner stated. Similarly, if operations of multiplication are being performed and the multiplier is a quantity less than unity, the characteristic of the ultimate logarithm will be decreased, depending upon the value of the decimal, whereas, if operations of division are being performed, the characteristic of the ultimate logarithm will be increased. It will also be apparent that each time the disk 29 is carried in a positive direction past its initial position, the characteristic of the ultimate logarithm should be increased by 1 and that each time this disk is carried in a reverse direction past its initial position, the characteristic of the ultimate logarithm must be decreased by 1. In order, therefore, to properly manipulate shaft 135 (Figs. 6 and 7) so that its ultimate position may properly indicate the characteristic which will determine the position of the decimal point in the result, it is necessary that manipulation of the P keys to the left of the x key shall have an opposite effect, in either multiplication or division, from multiplication of the P keys to the right of the y key. For this purpose, I provide a shaft 140 (Figs. 3 and 7) having a pair of fingers 141 opposite each pair of pawls 133 and 134 and these fingers are so arranged that in the normal or middle position of the shaft, both pawls are held out of possible active engagement with the adjacent ratchet wheels. The fingers are so arranged also that when the shaft 140 is rotated in one direction, pawls 133 at the left of the x key and pawls 134 at the right of the y key will be permitted to come into action, whereas, movement of shaft 140 in the opposite direction will permit pawls 134 to the left of the x key and pawls 133 to the right of the y key to come into active position. Shaft 140 is manipulated by means of a link 150 (Figs. 6 and 10) provided at its lower end with an arc-shaped slot 151 receiving a pin 152 carried by a crank 153 carried by shaft 71, so that manipulation of this shaft, by pressure upon either the D or the M end of its operating lever, will determine the groups of pawls 133 and 134 which come into action at any given time, depending upon whether operations of multiplication or operations of division are to be performed.

In order to shift the decimal shaft when disk 29 passes through its initial position in either direction, I mount upon shaft 27, conveniently attached to the clutch member 26, a pair of cams 160 and 161, (Figs. 1, 5 and 6) each of these cams being substantially circular throughout the major portions of their peripheries, and each having a notch 160', 161', respectively, forming a sudden drop in the surface of the cam at the initial position, these two notches being faced in opposite directions. Cooperating with cam 160 is a lever 162 pivoted at 163 and normally urged toward the cam by a spring 164. Similarly cooperating with cam 161 is a lever 165 which is pivoted on the same pivot 163 and is normally urged toward the cam by spring 164. Pivoted to the two levers 162 and 165 are vertical links 166 and 167, respectively, which are supported in a suitable vertical guide 168. These links at their lower end carry pins 166' and 167', respectively, which enter longitudinal slots in links 169 and 170, respectively, which are pivotally connected to a pair of arms 171 (Figs. 5, 6 and 10) carried by the shaft 71, the arrangement being such that when shaft 70 is rocked in either direction, one of the arms 166, or 167, will be drawn down so as to lift the corresponding lever 162, or 165, away from cooperative relationship with its cam while at the same time the other lever is left free for cooperation with the surface of the cam. Links 169 and 170 are arranged so that when the M or the D key is depressed, the first half of the stroke is consumed in setting the corresponding lever 162 or 165 before crank 153 (which is also slotted and consequently does not act on link 150 until the second half of the stroke of the movement of the M and D keys), shifts shaft 140. This is necessary in case shoulder 160' or 161' is under the corresponding lever 162 or 165 when the M or D key is depressed, as under these circumstances, pawls 1330 and 1340 (Figs. 6 and 10) should not act on ratchet wheels 133' or 134'. Lever 162 operates upon a cross head 172 provided with a pawl 1330 like pawls 133 and lever 165 acts upon a cross head 172' which carries a pawl 1340 similar to the pawls 134, said pawls 1330 and 1340 cooperating with a pair of ratchet wheels 133'—134', like those previously described. Cooperating with the pawls 1330 and 1340 are a pair of arms 141 on shaft 140, so that as shaft 140 is rocked, by depressing the M or D key, the proper one of ratchets 1330 and 1340 will be made active. It is apparent from the above that whenever the crests of the cams 160 and 161 pass initial point, the decimal shaft 135 will be either advanced or retracted one step, depending upon whether the operation which is then being performed is one of multiplication or division.

After a result has been indicated by the indicator bars R, S and T, (Fig. 2) it is, of course, necessary that there be an indication of position of the decimal point relative to the result R, S, T, as determined by the position to which shaft 135 has been carried.

For this purpose, I arrange between the bars R and S and S and T (Fig 2), and at the left of bar R and at the right of bar T, a series of slides P', which will carry upon their faces a decimal point which may be made visible through the sight opening of the bracket 57. Arranged between the several bars P' to the left of bar R and to the right of bar T, are similar slides O' which will bear upon their faces a cipher which may be made visible through the sight opening of bracket 57. Each of these slides O' and P' is, at proper time as hereinafter described, urged upwardly by an independent spring 173 and each carries a finger 174 (Fig. 4) which is brought out to a point immediately beneath shaft 135. Opposite each finger 174, I provide a cam 175 which is so formed as to normally block upward movement of the subjacent finger 174, but to permit such upward movement when shaft 135 has been rotated to such a point as to make desirable such upward movement. The several springs 173 surround stems 176 which are carried by a cross head 177 (Figs. 2 and 4). Springs 173 are provided with extension stops so that normally they do not tend to press upwardly fingers 174, but these several springs 173 rest upon a vertically-movable abutment 178, carried by links 179, supported by arms 180, carried by a rock shaft 181, said rock shaft having an operating arm 182, connected to an operating key 183 which is normally urged upwardly by a spring 184, the arrangement being such that when key 183 is depressed, all of the springs 173 will be put under compression so as to urge the several fingers 174 of the keys O', P', upwardly against the adjacent cams 175. Wherever a cut-away portion of one of these cams has been brought opposite the adjacent finger 174, it is apparent that the finger may move upwardly so as to expose through the sight opening of bracket 57 the proper decimal point and all of the ciphers to indicate the actual numerical value of the indication given by the keys R, S and T.

Key 183 (Figs. 1, 2 and 4) is connected by a lever 190 with a rock shaft 191, provided with an arm 192, gaging a disk 193 which is concentric with shaft 27, said disk 193 lying behind the head of pin 31, so as to normally retract said pin from engagement with disk 29, the arrangement being such that when the key 183 is depressed, pin 31 may be projected by its spring into engagement with disk 29 and will, when proper registry is obtained, be projected into hole 30 of said disk 29.

I claim as my invention:

1. In a calculating machine, setting-up mechanism comprising a primary element to be positioned, a plurality of gage elements movably associated with said primary element, a stop member between each adjacent two of said elements, said stop member being relatively adjustable between its members to determine the amount of relative movement, a final stop member arranged in the path of movement of the final of said elements and adjustable to different positions to determine the amount of movement of said final element, finger keys connected to said stop members for setting the same, and means for indicating the positions of said stop members.

2. In a calculating machine, setting-up mechanism comprising a primary element to be positioned, a plurality of gage elements movably associated with said primary element, a stop member between each adjacent two of said elements, said stop member being relatively adjustable between its members to determine the amount of relative movement, and a final stop member arranged in the path of movement of the final of said elements and adjustable to different positions to determine the amount of movement of said final element.

3. In a calculating machine, setting-up mechanism comprising a plurality of elements arranged in a series and all movable in one direction, a stop member arranged between each adjacent pair of said elements and carried by one of said elements, said stop member being adjustable relative to said elements transversely of the movement of said elements and cooperating with said elements to determine the extent of relative movement, a final stop member adjustable transversely of the movement of the final element of the series and cooperating therewith to determine the extent of movement of said final element, finger keys connected to said stop member for setting the same, and means for indicating the positions of said stop members.

4. In a calculating machine, setting-up mechanism comprising a plurality of elements arranged in a series and all movable in one direction, a stop member arranged between each adjacent pair of said elements and carried by one of said elements, said stop member being adjustable relative to said elements transversely of the movement of said elements and cooperating with said elements to determine the extent of relative movement, and a final stop member adjustable transversely of the movement of the final element of the series and cooperating therewith to determine the extent of movement of said final element.

5. In a calculating machine, setting-up mechanism comprising a shaft, a wheel carried thereby and circumferentially divided into 40-degree segments by laterally displaced stop-engaging members, a swinging arm cooperating with said wheel and having stop-engaging portions laterally spaced into ten 4-degree steps, a stop carried by said arm and transversely movable on the arm into the path of movement of any one of the stop-engaging members of the wheel, a finger key, connections between said key and stop for shifting the stop, said connections comprising a pair of members separable in the direction of movement of the wheel, a stop transversely adjustable to cooperate with any stop-engaging portion on the arm, and a finger key connected to said last-mentioned stop to operate the same.

6. In a calculating machine, setting-up mechanism comprising a shaft, a wheel carried thereby and circumferentially divided into segments by laterally displaced stop-engaging members, a swinging arm cooperating with said wheel and having stop-engaging portions laterally spaced into steps, a stop carried by said arm and transversely movable on the arm into the path of movement of any one of the stop-engaging members of the wheel, a finger key, connections between said key and stop for shifting the stop, said connections comprising a pair of members separable in the direction of movement of the wheel, a stop transversely adjustable to cooperate with any stop-engaging portion on the arm, and a finger key connected to said last-mentioned stop to operate the same.

7. In a calculating machine, setting-up mechanism comprising a shaft, a wheel carried thereby and circumferentially divided into 40-degree segments by laterally displaced stop-engaging members, a swinging arm cooperating with said wheel and having stop-engaging portions laterally spaced into ten 4-degree steps, a stop carried by said arm and transversely movable on the arm into the path of movement of any one of the stop-engaging members of the wheel, and a stop transversely adjustable to cooperate with any stop-engaging portion on the arm.

8. In a calculating machine, setting-up mechanism comprising a shaft, a wheel carried thereby and circumferentially divided into segments by laterally displaced stop-engaging members, a swinging arm cooperating with said wheel and having stop-engaging portions laterally spaced into steps, a stop carried by said arm and transversely movable on the arm into the path of movement of any one of the stop-engaging members of the wheel, and a stop transversely adjustable to cooperate with any stop-engaging portion on the arm.

9. In a calculating machine, setting-up mechanism comprising a shaft, a wheel carried thereby and circumferentially divided into 40-degree segments by laterally displaced stop-engaging members, a swinging arm cooperating with said wheel and having stop-engaging portions laterally spaced into ten 4-degree steps, a stop carried by said arm and transversely movable thereon into the path of movement of any one of the stop-engaging members of the wheel, a second swinging arm cooperating with the first swinging arm and having stop-engaging portions laterally spaced into ten 0.4-degree steps, a stop carried by said second arm and transversely movable thereon into the path of movement of any one of the stops on the first arm, a stop transversely adjustable to cooperate with any stop-engaging step of the second arm, and finger-keys connected to said stops for setting the same, said connections embodying portions separable in the line of movement of the swinging arms.

10. In a calculating machine, setting-up mechanism comprising a shaft, a wheel carried thereby and circumferentially divided into 40-degree segments by laterally displaced stop-engaging members, a swinging arm cooperating with said wheel and having stop-engaging portions laterally spaced into ten 4-degree steps, a stop carried by said arm and transversely movable thereon into the path of movement of any one of the stop-engaging members of the wheel, a second swinging arm cooperating with the first swinging arm and having stop-engaging portions laterally spaced into ten 0.4-degree steps, a stop carried by said second arm and transversely movable thereon into the path of movement of any one of the stops on the first arm, and a stop transversely adjustable to cooperate with any stop-engaging step of the second arm.

11. In a calculating machine, setting-up mechanism comprising a shaft, a wheel carried thereby and circumferentially divided into segments by laterally displaced stop-engaging members, a swinging arm cooperating with said wheel and having stop-engaging portions laterally spaced into steps, a stop carried by said arm and transversely movable thereon into the path of movement of any one of the stop-engaging members of the wheel, a second swinging arm cooperating with the first swinging arm and having stop-engaging portions laterally spaced into steps, a stop carried by said second arm and transversely movable thereon into the path of movement of any one of the stops on the first arm, a stop transversely adjustable to cooperate with any stop-engaging step of the second arm, and finger-keys connected to said stops for setting the same, said connections embodying portions separable in the line of movement of the swinging arms.

12. In a calculating machine, setting-up mechanism comprising a shaft, a wheel carried thereby and circumferentially divided into segments by laterally displaced stop-engaging members, a swinging arm cooperating with said wheel and having stop-engaging portions laterally spaced into steps, a stop carried by said arm and transversely movable thereon into the path of movement of any one of the stop-engaging members of the wheel, a second swinging arm cooperating with the first swinging arm and having stop-engaging portions laterally spaced into steps, a stop carried by said second arm and transversely movable thereon into the path of movement of any one of the stops on the first arm, and a stop transversely adjustable to co-operate with any stop-engaging step of the second arm.

13. In a calculating machine, the combination with an element capable of movement to successive positions corresponding to the logarithmic values, of take-off mechanism for indicating said values comprising a group of associated elements, the primary element of said group being provided with a series of nine equal steps, succeeding elements of the series each having its periphery divided into steps having an angular extent equal to one-tenth of the angular extent of one step of the preceding element, indicating means cooperating with the steps of said elements, said means comprising a series of slides each movable into engagement with any selected step of an appropriate one of said elements, finger keys controlling said slides, and indicators associated with said slides for indicating the positions thereof as determined by their engagement with said elements.

14. In a calculating machine, the combination with an element capable of movement to successive positions corresponding to the logarithmic values, of take-off mechanism for indicating said values comprising a group of associated elements, the primary element of said group being provided with a series of nine equal steps, succeeding elements of the series each having its periphery divided into steps having an angular extent equal to one-tenth of the angular extent of one step of the preceding element, and indicating means cooperating with the steps of said elements.

15. In a calculating machine, the combination with an element capable of movement to successive positions corresponding to the logarithmic values, of take-off mechanism for indicating said values comprising a group of associated elements, the primary element of said group being provided with a series of equal steps, succeeding elements of the series each having its periphery divided into steps having an angular extent equal to an aliquot part of the angular extent of one step of the preceding element, indicating means cooperating with the steps of said elements, said means comprising a series of slides each movable into engagement with any selected step of an appropriate one of said elements, finger keys controlling said slides, and indicators associated with said slides for indicating the positions thereof as determined by their engagement with said elements.

16. In a calculating machine, the combination with an element capable of movement to successive positions corresponding to the logarithmic values, of take-off mechanism for indicating said values comprising a group of associated elements, the primary element of said group being provided with a series of equal steps, succeeding elements of the series each having its periphery divided into steps having an angular extent equal to an aliquot part of the angular extent of one step of the preceding element, and indicating means cooperating with the steps of said elements.

17. In a calculating machine, the combination with an element capable of movement to successive positions corresponding to the logarithmic values, of take-off mechanism for indicating said values comprising a shaft, a plurality of disks carried by said shaft, one of said disks having its periphery formed into a series of nine steps and the other of said disks having their peripheries formed into series of successively finer steps as sub-divisions of the angular extent of the first disk, a series of slides each arranged to cooperate with the periphery of one of said disks, means for yieldingly urging said slides into engagement with said disks, finger keys for controlling said slides, and indicators connected to said slides.

18. In a calculating machine, the combination with an element capable of movement to successive positions corresponding to the logarithmic values, of take-off mechanism for indicating said values comprising a shaft, a plurality of disks carried by said shaft, one of said disks having its periphery formed into a series of steps and the other of said disks having their peripheries formed into series of successively finer steps as sub-divisions of the angular extent of the first disk, a series of slides each arranged to cooperate with the periphery of one of said disks, means for yieldingly urging said slides into engagement with said disks, finger keys for controlling said slides, and indicators connected to said slides.

19. In a calculating machine, the combination with an element capable of movement to successive positions corresponding to the logarithmic values, of take-off mechanism for indicating said values comprising a shaft, a plurality of disks carried by said shaft, one of said disks having its periphery formed into a series of nine steps and the other of said disks having their peripheries formed into series of successively finer steps as sub-divisions of the angular extent of the first disk.

20. In a calculating machine, the combination with an element capable of movement to successive positions corresponding to the logarithmic values, of take-off mechanism for indicating said values comprising a shaft, a plurality of disks carried by said shaft, one of said disks having its periphery formed into a series of steps and the other of said disks having their peripheries formed into series of successively finer steps as sub-divisions of the angular extent of the first disk.

21. In a calculating machine, the combination with an element capable of movement to successive positions corresponding to the logarithmic values, of take-off mechanism for indicating said values comprising a series of slides, springs independently urging said slides in one direction, finger keys controlling the action of said springs, indicators connected to said slides, and adjustable means cooperating with said slides to determine the extent of movement thereof.

22. In a calculating machine, an element capable of movement to successive positions corresponding to logarithmic values, number-indicating means, connections between said number-indicating means and the logarithmic element by which movement of the number-indicator produces a corresponding logarithmic movement of the logarithmic indicator, a decimal indicator, means by which the decimal indicator may be shifted to indicate decimal values of the numbers indicated by the number indicator, and means controlled by the logarithmic indicator for shifting the decimal indicator as the logarithmic indicator passes in either direction through its zero position.

23. In a calculating machine, a number-indicating element, a setting element movable to successive positions in either direction, a driving train between said number-indicating element and setting element whereby movement of the number-indicating element may cause movement of the setting element in either direction through a distance corresponding to the logarithm of the indicated number, and a controlling member for determining the direction-effect of said driving train on the setting element preliminary to movement of the number-indicating element.

24. In a calculating machine, an oscillatory number-indicating element, a rotary setting element, a driving train between the oscillatory member and the setting element embodying a separable clutch and members serving to shift the setting element through distances corresponding to the logarithms of distances through which the number-indicating element is moved, a driving member for the number-indicating member, a shifting member for the clutch, connections between said shifting member and driving member, and a controlling member determining the time of activity of said clutch relative to the movement of the oscillating member.

25. In a calculating machine, an oscillating driving member, a number-indicating wheel, a shiftable clutch to connect said driving member and wheel, a cam initially holding said clutch out of connection with the number-indicating wheel, a rotatable setting member, a clutch for connecting said number-indicating wheel with the setting member during either its forward or backward movement, a shifting member for said clutch, a cam for operating said shifting member, connections between the driven member and said cams, reversible connections between said last-mentioned shifting member and the clutch, and a controlling member for reversing said connections.

26. In a calculating machine, an oscillating driving member, a number-indicating wheel, a shiftable clutch to connect said driving member and wheel, a cam initially holding said clutch out of connection with the number-indicating wheel, a rotatable setting member, a clutch for connecting said number-indicating wheel with the setting member during either its forward or backward movement, a cam for controlling said last-mentioned clutch, a walking beam operated by said cam, a shifting member connected to the clutch, a link connected to said shifting member, and an oscillating member connected to said link to shift the same into engagement with one end or the other of the walking beam.

27. In a calculating machine, the combination with a rotatable setting member movable in either direction through a zero position, of a rotatable shaft for indicating decimal position, ratchet mechanisms for shifting said shaft step by step in either direction, a pair of cams connected with said setting member, a pair of levers each cooperating with one of said cams and with the ratchet mechanisms to shift the decimal shaft in one direction, and a controlling member for alternating the activity of said levers relative to the cams.

28. In a calculating machine, the combination with a rotatable setting member movable in either direction through a zero position, of a rotatable shaft for indicating decimal position, ratchet mechanisms for shifting said shaft step by step in either direction, a pair of cams connected with said setting member, a pair of levers each cooperating with one of said cams and with the ratchet mechanisms to shift the decimal shaft in one direction, an oscillating controlling shaft, a pair of links each connected to one of said levers and a one-way connection between each of said levers and said controlling shaft.

29. In a calculating machine, the combination with a rotatable setting member movable in either direction through a zero position, of a rotatable shaft for indicating decimal position, ratchet mechanisms for shifting said shaft step by step in either direction, a pair of cams connected with said setting member, a pair of levers each cooperating with one of said cams and with the ratchet mechanisms to shift the decimal shaft in one direction, an oscillating controlling shaft, a pair of links each connected to one of said levers, a one-way connection between each of said levers and said controlling shaft, and means for shifting said ratchet mechanism alternately into and out of active position, said shifting means comprising a connection with the controlling shaft permitting a limited independent movement of the controlling shaft in either direction from neutral.

30. In a calculating machine, a decimal indicator comprising a shaft, ratchet mechanism for shifting said shaft step by step in either direction, finger keys controlling said ratchet mechanism, a rotatable setting member, ratchet mechanism connected with said setting member for shifting the decimal shaft one step as the setting member passes through its initial position, a series of cams carried by said shaft, a series of decimal indicating slides cooperating with said cams, means for yieldingly urging said slides into cooperation with said cams, and means for manually controlling said yielding means.

31. In a calculuating machine, a decimal indicator comprising a shaft, ratchet mechanism for shifting said shaft step by step in either direction, finger keys controlling said ratchet mechanism, a rotatable setting member, ratchet mechanism connected with said setting member for shifting the decimal shaft one step as the setting member passes through its initial position, a series of cams carried by said shaft, and a series of decimal indicating slides cooperating with said cams.

In witness whereof, I have hereunto set my hand at Indianapolis, Indiana, this 29th day of December, A. D. one thousand nine hundred and nineteen.

TAYLOR W. ROSS.